Oct. 12, 1965    H. L. BROWNE ETAL    3,211,491
VEHICLE BODY SHAKE ABSORBER

Filed Nov. 29, 1963    2 Sheets-Sheet 1

HORACE L. BROWNE
ROBERT A. MYERS
INVENTORS

BY
John R. Faulkner
John J. Roethel
ATTORNEYS

HORACE L. BROWN
ROBERT A. MYERS
INVENTORS

United States Patent Office
3,211,491
Patented Oct. 12, 1965

3,211,491
VEHICLE BODY SHAKE ABSORBER
Horace L. Browne, Dearborn, and Robert A. Myers, Garden City, Mich., assignors to Ford Motor Company, Dearborn, Mich., a corporation of Delaware
Filed Nov. 29, 1963, Ser. No. 326,939
1 Claim. (Cl. 296—28)

This invention relates to vehicle body shake absorber and vibration dampener devices.

The current approach to the problem of controlling vehicle body shake and vibration appears to be limited to increasing body or body and frame rigidity to limit maximum amplitudes, to reducing amplitudes of shake and vibration by detuning the natural frequency of various exciting components from the natural frequency of the body, and to isolating the body from exciting components by using flexible mounts. These control measures have inherent disadvantages in that an increase in body or body and frame rigidity frequently results in a so-called "harsh" vehicle ride; and the detuning or isolation of exciting components from the vehicle body requires the establishment of critical relationship between the exciting components and the vehicle body not too easily obtainable on high volume production lines. To avoid these disadvantages, rigidity must often be compromised to avoid undue "harshness" of vehicle ride, and detuning or isolation must be compromised to avoid the creation of overly critical relationships between the exciting components and the vehicle body.

Accordingly, it is an object of the present invention to provide a supplement to the current control measures that will be effective to reduce shake and vibration at all applied frequencies, that will allow the body to be less rigid and thereby produce a less harsh ride, or that will make detuning and isolation less critical.

The present invention is premised on the rather obvious fact that certain points on a body, such as a vehicle body, will move relative to each other when the body shakes or vibrates. In carrying out the present invention, selected points are connected through an energy absorbing member adapted to function as a shock absorber and vibration dampener. This will cause an energy loss and corresponding reduction in amplitude of vibration.

Although the application of shock absorbers and vibration dampeners to vehicle suspension systems and between the frame and the body of an automobile is old in the art, it is not known to provide shock absorbing or vibration dampening means between different body elements in the manner proposed by the present invention. On the contrary, the common thing is to provide stiffening elements between the body members in order to completely prevent the shake or vibrations.

The energy absorbing member embodying the present invention comprises a structural brace incorporating a viscoelastic material as the energy absorber.

Hard rubber and many plastics have good energy absorbing characteristics at body shake and vibration frequencies because of hysteresis or internal friction. These materials can be utilized when loaded in shear or loaded in tension and compression. Rubber or plastic is most suitable for the application, but liquids can also be used. For comparison, steel has relatively poor energy absorbing characteristics at body shake frequencies.

Further objects, advantages and features of this invention will become more apparent as this description proceeds, particularly when considered in conjunction with the accompanying drawings in which.

Figure 1:
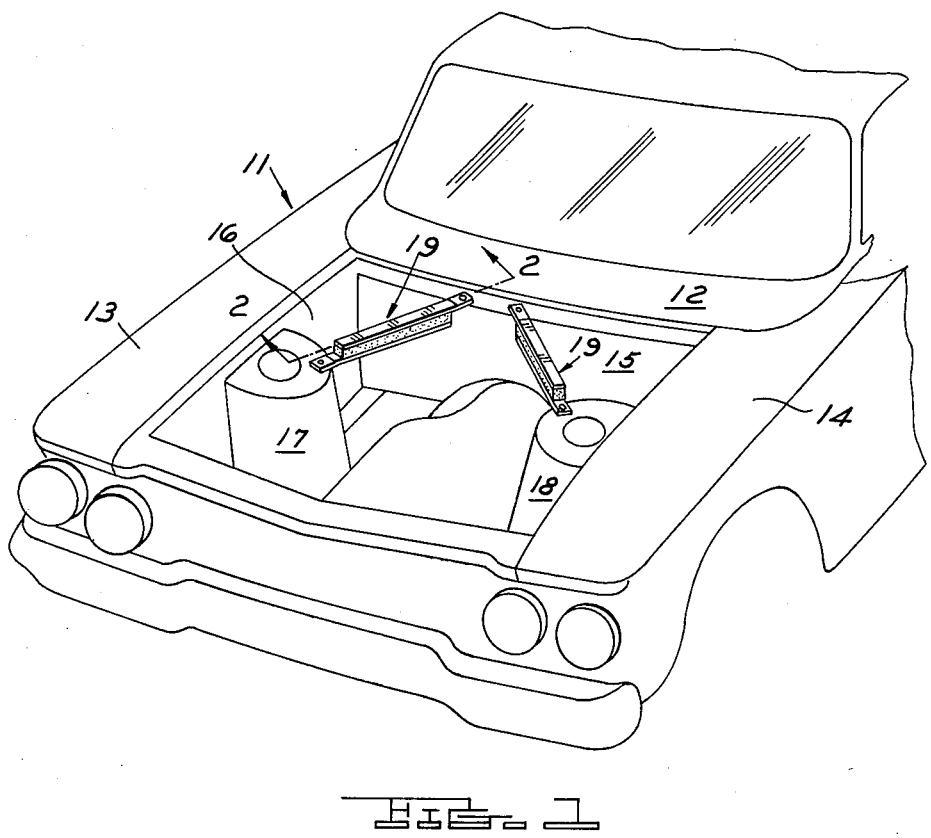
FIG. 1 is a perspective view of a portion of a vehicle body illustrating the application of a body shake absorber or vibration dampener means embodying the present invention.

Referring now to FIG. 1, the reference numeral 11 designates generally the front end structure of a vehicle body. This front end structure is shown substantially in outline form to exemplify one environment to which a body shake absorber or vibration dampener device embodying the present invention is applicable. The exemplary front end structure 11 comprises a cowl structure 12, right and left front fenders 13 and 14, a dash or fire wall 15, a right fender apron 16 (the left apron not being visible), and spring towers 17 and 18. Other components of the front end structure are also shown but are not believed to require detailed identification for an understanding of this invention.

In a conventional vehicle body front end structure, a steel brace extends from each spring tower to a point of connection with the dash. Although such braces contribute to rigidity of the front end structure, they have relatively poor energy absorbing characteristics at body shake frequencies.

We propose that the conventional steel braces be replaced with body shake absorber or vibration dampener devices embodying the present invention, as shown in FIG. 1. These body shake absorber or vibration dampener devices may hereinafter be referred to as energy absorbing members and are generally designated 19.

Figure 2:
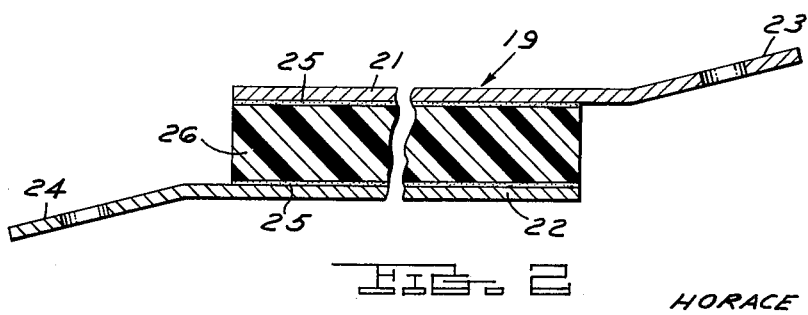
FIG. 2 is a sectional view taken along the line 2—2 of FIG. 1.

Referring now to FIG. 2, a typical energy absorbing member 19 is shown in vertical cross section. It comprises a pair of elongated steel straps 21 and 22, each of which terminates in an apertured end section 23 or 24, respectively. The main portions of the straps 21 and 22 are bonded with a suitable bonding material, indicated at 25, to the opposite parallel faces or sides of an elongated strip of viscoelastic material, indicated at 26. It should be noted, however, that riveted or bolted arrangements may be utilized.

It will be noted in FIG. 2 that the extensions 23 and 24 of the straps 21 and 22 extend in opposite directions from the laminated portion of the energy absorbing member 19. The extension 23 of the strap 21 is adapted to be bolted or welded to a convenient flange or bracket at the juncture of the dash 15 and cowl structure 12. The extension 24 of the strap 22 is adapted to be bolted or welded to the top of a spring tower 17 or 18.

The viscoelastic material used may comprise any of a variety of rubber or plastic materials. We have conducted tests utilizing a general purpose, black, hard rubber, Durometer A80–86, tensile strength 9,300 p.s.i.; and Butyl rubber, unvulcanized, Durometer A70–75.

A vehicle front end structure having energy absorbing members utilizing these materials and installed as shown in FIG. 1, when compared with a front end structure having conventional steel braces, shows a substantial reduction in both bending and torsional shake. Energy absorbing members with general purpose, black, hard rubber as the viscoelastic material reduced both bending and torsional shake about 8 percent. Energy absorbing members utilizing the unvulcanized Butyl rubber reduced bending shake 11.6 percent and torsional shake 7.1 percent.

Figure 3:
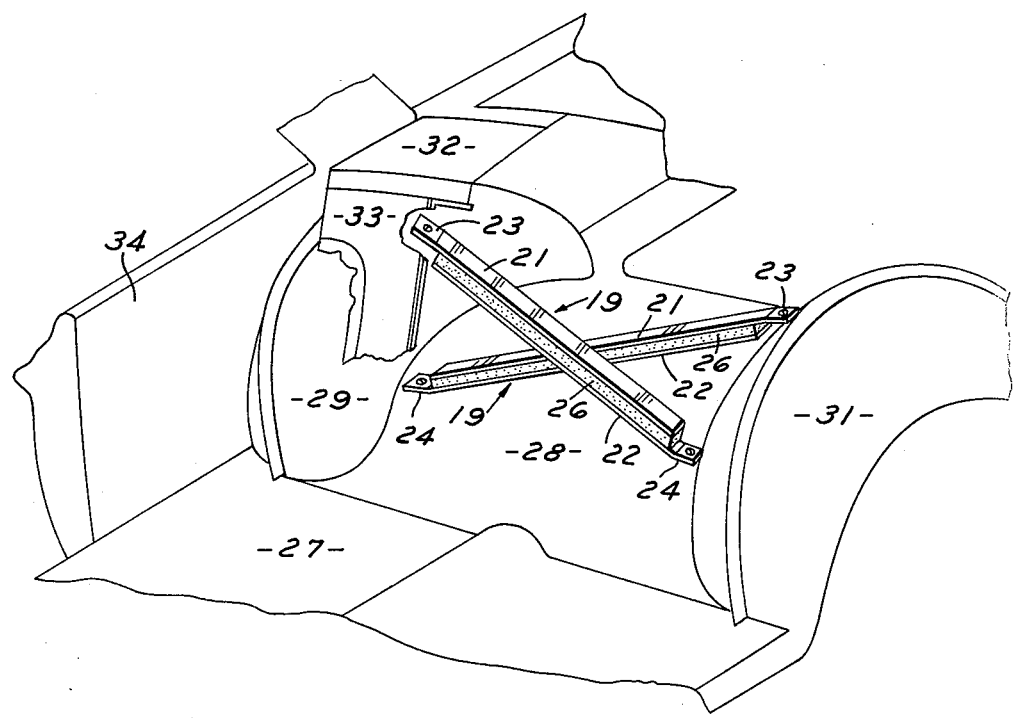
FIG. 3 is a perspective view of another portion of a vehicle body illustrating the application of the body shake absorber or vibration dampener device in a second application.

FIG. 3 illustrates the application of the energy absorbing members 19 to another portion of the vehicle body which is subject to high shake and vibration inducing forces. This is the portion of the body over the rear axle. Illustrated is a portion of the floor pan 27, a portion of the kickup section 28 of the floor pan or underbody which accommodates the rear axle and the suspension system for the rear axle, the wheel housings 29 and 31, the package tray 32 and the wall 33 dividing the passenger compartment from the rear luggage compartment, and the side panel 34 at one side of the vehicle. The energy absorbing members 19 are shown extending laterally of the vehicle body with the end sections 23-24 of the straps 21-22 bolted to the kickup portion of the underbody and to the top of the wheel housings, respectively.

We believe that the present invention provides a novel approach to the problem of reducing body shake and vibration effects. Although the prior art indicates that it is old to provide shock absorbing means between the suspension and the frame, and between the frame and the body of an automobile, it has been the practice to provide stiffening elements between body members in an attempt to prevent completely shake and vibrations. We find that the application of energy absorbing members between different body elements provides a substantial reduction in body shake and vibration. This result can be obtained without creating a harsh ride or without requiring critical detuning and isolation of the respective components which are utilized in constructing a vehicle.

It will be understood that the invention is not to be limited to the exact construction shown and described, but that various changes and modifications may be made without departing from the spirit and scope of the invention as defined in the appended claim.

We claim:
In a vehicle body having a spaced body components subject to body shake and vibration movements,
  said spaced body components comprising a vehicle underbody portion and a wheel housing,
  an elongated brace extending laterally and upwardly across said vehicle body,
  said brace comprising a first rigid strap connected at one end of said brace to said underbody portion and a second rigid strap connected at the other end of said brace to an upper part of said wheel housing,
  a substantial portion of one strap lying in spaced, overlapping, relationship to the other,
  and a layer of viscoelastic material sandwiched between said overlapping portions,
  said viscoelastic material in response to forces exerting relative movement effects on said strap portions providing body shake and vibration energy absorption through hysteresis and internal friction at body shake and vibration frequencies.

References Cited by the Examiner

UNITED STATES PATENTS

| | | | |
|---|---|---|---|
| 1,699,332 | 1/29 | Link | 180—64 |
| 1,840,080 | 1/32 | Breer | 180—64 |
| 2,018,870 | 10/35 | Paton | 296—1 |
| 2,028,551 | 1/36 | Lord. | |
| 2,043,725 | 6/36 | Anderson. | |
| 2,231,769 | 2/41 | Merrill | 267—63 X |
| 2,306,416 | 12/42 | Waterhouse | 296—28 |
| 2,817,557 | 12/57 | Reynolds | 296—28 |

FOREIGN PATENTS 704,902  4/41  Germany.

BENJAMIN HERSH, *Primary Examiner.*
A. HARRY LEVY, *Examiner.*